United States Patent
Peyrovian

(10) Patent No.: US 6,757,519 B2
(45) Date of Patent: *Jun. 29, 2004

(54) SCALABLE SWITCH MATRIX AND DEMODULATOR BANK ARCHITECTURE FOR A SATELLITE UPLINK RECEIVER

(75) Inventor: M. Javad Peyrovian, Irvine, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/295,206

(22) Filed: Nov. 14, 2002

(65) Prior Publication Data

US 2003/0068976 A1 Apr. 10, 2003

Related U.S. Application Data

(63) Continuation of application No. 09/732,955, filed on Dec. 7, 2000, which is a continuation of application No. 09/369,069, filed on Aug. 5, 1999, now Pat. No. 6,236,833.

(51) Int. Cl.[7] .......................... H04B 7/15; H04B 7/185
(52) U.S. Cl. ................. 455/11.1; 455/13.3; 455/562.1; 342/373; 342/374
(58) Field of Search ............................ 455/562.1, 13.3, 455/12.1, 428; 342/374, 373

(56) References Cited

U.S. PATENT DOCUMENTS

| | | | |
|---|---|---|---|
| 4,425,639 A | * 1/1984 | Acampora et al. | 370/323 |
| 5,093,668 A | * 3/1992 | Sreenivas | 342/374 |
| 5,121,409 A | 6/1992 | Goss | 455/12.1 |
| 5,428,814 A | * 6/1995 | Mort et al. | 455/12.1 |
| 5,570,352 A | * 10/1996 | Poyhonen | 370/330 |
| 5,610,617 A | * 3/1997 | Gans et al. | 342/373 |
| 5,790,529 A | * 8/1998 | Haber | 370/536 |
| 5,854,611 A | * 12/1998 | Gans et al. | 342/373 |
| 5,907,816 A | * 5/1999 | Newman et al. | 455/562.1 |
| 5,978,359 A | 11/1999 | Caldara et al. | 370/236 |
| 6,236,833 B1 | 5/2001 | Peyrovian | 342/374 |
| 6,246,274 B1 | 6/2001 | Sakai et al. | 370/334 |
| 6,246,674 B1 | * 6/2001 | Feuerstein et al. | 370/334 |
| 6,377,783 B1 | * 4/2002 | Lo et al. | 455/101 |
| 6,539,201 B2 | * 3/2003 | Peyrovian | 455/562.1 |

FOREIGN PATENT DOCUMENTS

EP  0 854 590 A2  7/1998 ........... H04B/7/185

* cited by examiner

*Primary Examiner*—Simon Nguyen
(74) *Attorney, Agent, or Firm*—Georgann S. Grunebach; John A. Crook, III

(57) ABSTRACT

A scalable switch matrix and demodulator bank architecture for a satellite payload processor wherein the demodulators are connected to the output ports of the switches as the data load on the uplink beams varies. The switch matrix includes a first switch layer for receiving the uplink transmission beams and a plurality of demodulators connected to the output parts of the first switch layer. The number of demodulators is limited by the number of active uplink sub-bands which is generally less than the number of sub-bands per beam times the number of transmission beams. Thus, only a relatively few number of demodulators are distributed among the uplink transmission beams as required. This results in a readily scalable architecture having higher demodulation utilization rates than dedicated demodulation architectures.

6 Claims, 2 Drawing Sheets

SCALABLE SWITCH MATRIX AND DEMODULATOR BANK ARCHITECTURE FOR A SATELLITE UPLINK RECEIVER

CROSS-REFERENCE TO RELATED APPLICATIONS

This is a continuation of U.S. patent application Ser. No. 09/732,955 filed on Dec. 7, 2000 which was a continuation of U.S. patent application Ser. No. 09/369,069 filed on Aug. 5, 1999, now issued as U.S. Pat. No. 6,236,833 on May 22, 2001, the entire contents of which are incorporated herein by this reference.

TECHNICAL FIELD

The present invention relates generally to switch matrices, and more particularly, to a scalable switch matrix and demodulator bank configuration for a high capacity multi-beam satellite uplink receiver.

BACKGROUND OF THE INVENTION

Generally, satellite uplink receivers are typically used to receive one or more uplink transmission beams carrying radio frequency signals. The receivers demodulate the signals for further processing, and transmit the data to downlink modulators for transmission on downlink beams. So far the satellites have been designed to process a relatively small number of uplink transmission beams. As a result, satellite uplink receivers generally have dedicated demodulators for each potential uplink transmission beam.

In order to increase the capacity and reuse the uplink spectrum frequently and efficiently, there has been growing interest in developing satellites capable of processing several hundred uplink beams. Each beam can potentially carry traffic up to the capacity of the full uplink spectrum. However, due to limitations on frequency re-use and satellite processing power, the total footprint capacity is generally much less than the maximum beam capacity times the number of transmission beams. Accordingly, in a satellite system designed to process, for example, 400 uplink beams each having 12 sub-bands, 4800 dedicated demodulators would be required. Because the maximum capacity is much less than the 4800 potential communication sub-bands, however, many demodulators would be underutilized and, even at maximum footprint traffic, many demodulators would be idle.

As a result of low utilization rates, a dedicated demodulator architecture has the drawbacks of relatively high power consumption and undesirable added weight to the satellite.

The traffic of a beam varies with the demand, time-of-day, and/or motion of the satellite (in the case of non-geosynchronous satellites). Thus, there exists a need for an uplink architecture with a pool of demodulators that can be assigned dynamically to the beams based on their needs. A scalable switch matrix provides reliable uplink signal processing, and reduces the amount of required hardware versus dedicated demodulator architectures, thereby eliminating additional power, volume, mass, and complexity.

DISCLOSURE OF THE INVENTION

The present invention has several advantages over existing architectures. The present invention is a scalable switch matrix and demodulator bank architecture for a satellite payload processor wherein the demodulators are connected to the output ports of the switches and assigned optimally to the beams as the load on the uplink beams varies. Thus, a smaller number of demodulators are required to process the uplink signals. This results in a readily scalable architecture having higher utilization of the demodulators, smaller switch sizes, and a higher efficiency and overall reliability.

These advantages are accomplished through the use of a high capacity switch matrix for processing data from many uplink transmission beams wherein each of the transmission beams is capable of carrying an active communication signal in any one of several sub-bands.

The switch matrix includes a first switch layer including one or more switches, each having several inputs and outputs. Each of the switch inputs are connected to receive one of the uplink transmission beams such that the total number of switch inputs is greater than or equal to the number of uplink input transmission beams. The switch matrix also includes a plurality of demodulators for retrieving data from the active communication sub-bands of the transmission beams. The total number of demodulators is limited to the maximum number of communication sub-bands which can be active at any one given time. This number is generally much less than the number of sub-bands per beam times the number of uplink transmission beams.

A second switch layer is connected between the first switch layer and the demodulators. The second switch layer includes groups of varying numbers of switches such that the output ports of the first switches are connected to a varying number of demodulators. Thus, when a first switch receives uplink transmission beams having many active communication sub-bands, it routes the data traffic to an output port having a corresponding number of demodulators.

In another aspect of the invention, a tandem switch is configured parallel to the first switch layer and is used to direct overflow traffic to underutilized switches in the first switch layer. This arrangement of the switch matrix allows any of the uplink transmission beams to be connected to a time-varying number of demodulators. Other advantages of the invention will become apparent when viewed in light of the following detailed description and appended claims, and upon reference to the accompanying drawings.

BRIEF DESCRIPTION OF THE DRAWINGS

For a more complete understanding of this invention, reference should now be had to the embodiments illustrated in greater detail in the accompanying drawings and described below by way of examples of the invention. In the drawings.

BEST MODE(S) FOR CARRYING OUT THE INVENTION

Figures 1, 1A:
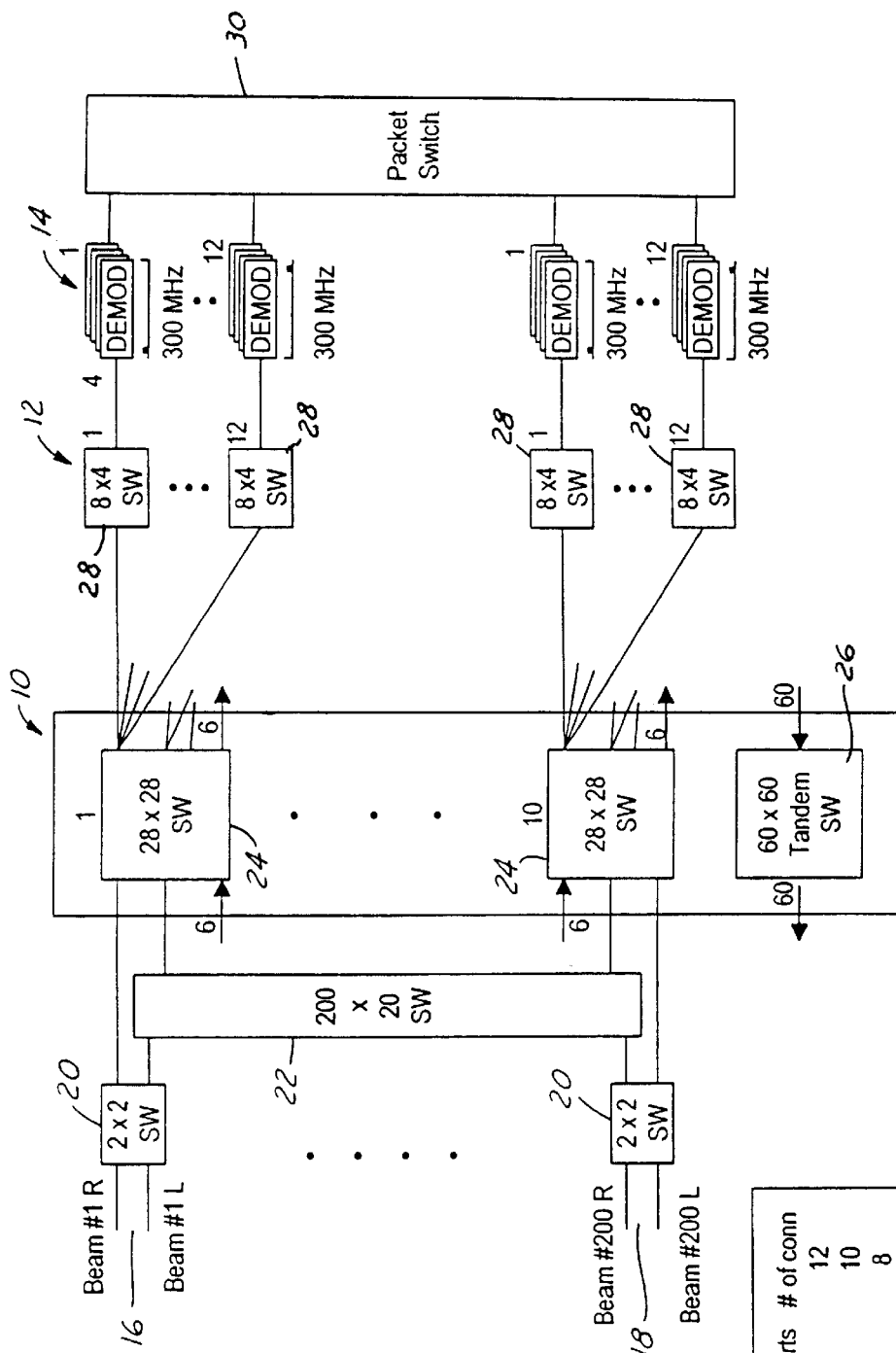
FIG. 1 is a schematic representation of a scalable switch matrix in accordance with one embodiment of the present invention.
FIG. 1A is a table representing the input and output connections associated with the first layer switches of FIG. 1.

Referring to FIG. 1, there is shown one embodiment of the scalable switch matrix and demodulator bank of the present invention. As shown in FIG. 1, the switch matrix includes a first switch layer 10, a second switch layer 12, and a plurality of demodulators 14. In this example, the switch matrix is configured to process a 400 beam uplink payload wherein the uplink beams are divided into 200 left and 200 right polarizations. Only the first beam 16 and the last beam 18 are shown, although it is to be understood that uplink transmission beams 2 through 199 would be similarly connected to the switch matrix.

Since one polarization is typically sufficient to carry the data load of a majority of uplink transmissions, a plurality of 2 ×2 switches 20 and a 200 ×20 switch 22 are used to pick up the desired polarization for the load traffic cells, and direct both polarizations to the first switch layer 10, if necessary, for uplink beams with heavy data traffic. Thus, there are 200 uplink transmission beams connected directly to the first switch layer 10 by the 2 ×2 switches 20, and as many as 20 additional uplink transmission beams can be connected to the first switch layer 10 by the 200 ×20 switch 22. This results in a total of 220 potential input transmission beams.

Alternatively, the 2 ×2 switches 20 and the 200 ×20 switch 22 could be eliminated and all of the uplink transmission beams could be directly connected to input ports of the switches within the first switch layer 10 for a total of 400 potential input transmission beams.

The first switch layer 10 includes ten 28×28 switches 24 which, in this case, are point-to-point switches. In this example, ten 28×28 switches 24 are shown because of the need to accommodate 220 inputs from the 2×2 switches 20 and the 200×20 switch 22, as well as six inputs per switch 24 received by the 60×60 tandem switch 26. Of course, any number of switches 24, including a single switch, could be used, and the size of the switch 24 could likewise be varied.

The tandem switch 26 is used to direct overflow traffic from switches 24 operating at full capacity to other switches 24 operating at less than full capacity as is known in the act.

Since each input transmission beam requires a variable number of demodulators to process the data traffic associated with the input beam, the output ports of the 28×28 switches 24 are connected to a varying number of 8×4 switches 28 in the second switch layer 12. The table in FIG. 1A shows the relationship between the number of output switch ports in the 28×28 switches 24 and the corresponding number of 8×4 switches 28 that those output ports are connected to. As shown in FIG. 1A, the first output port is connected to 12, 8×4 switches 28; the next two output ports are connected to 10, 8×4 switches 28; the next two output ports are connected to eight, 8×4 switches 28; and so on. By changing the relationship of the output ports and the connections in the second switch layer, the traffic pattern that the switches 24 of the first switch layer can support can be altered.

Referring again to FIG. 1, the maximum number of 8×4 switches 28 connected to any single output port of the 28×28 switches 24 is 12 which, in this example, corresponds to the number of frequency channels or sub-bands associated with each uplink transmission beam.

The demodulators 14 connected to a particular 8×4 switch 28 are all of the same type and operate at the same frequency band. The demodulators 14 connected to different 8×4 switches 28 of the same 28×28 switch 24 operate at different frequency bands. The sum of these frequency bands covers the entire allocated frequency spectrum which, in this case, is shown as 300 MHz. Once the demodulators 14 process the data received in the uplink transmission beams, the data is passed to packet switch 30 for routing the packets and then modulation and transmission on one or more downlink beams (the downlink modulators and transmitter is not shown).

The total number of demodulators is a function of the maximum data rate for the entire uplink footprint. Due to the satellite processing power, among other things, the total footprint traffic is generally much less than the maximum beam capacity times the number of uplink transmission beams. In the case of the switch shown in FIG. 1, the total number of demodulators is 480. This corresponds to four demodulators per sub-band, per input switch bank. This contrasts with the 4800 demodulators which would be required in a dedicated architecture for 400 transmission beams each having 12 sub-bands. Here, the maximum data rate is defined as the total number of sub-bands in each transmission beam which could be active at any one time.

All of the switches shown in FIG. 1 can receive and implement the commands from a central processor (not shown) to connect any input port to any output port. The central processor is aware of the footprint traffic and the active sub-bands within each beam.

The tandem switch 26 is used to distribute the load to other switches 24 if the load on one or more of the 28×28 switches 24 exceeds the demodulator availability at those switches. The central processor determines which beams need to be off-loaded to other switches.

Figure 2:
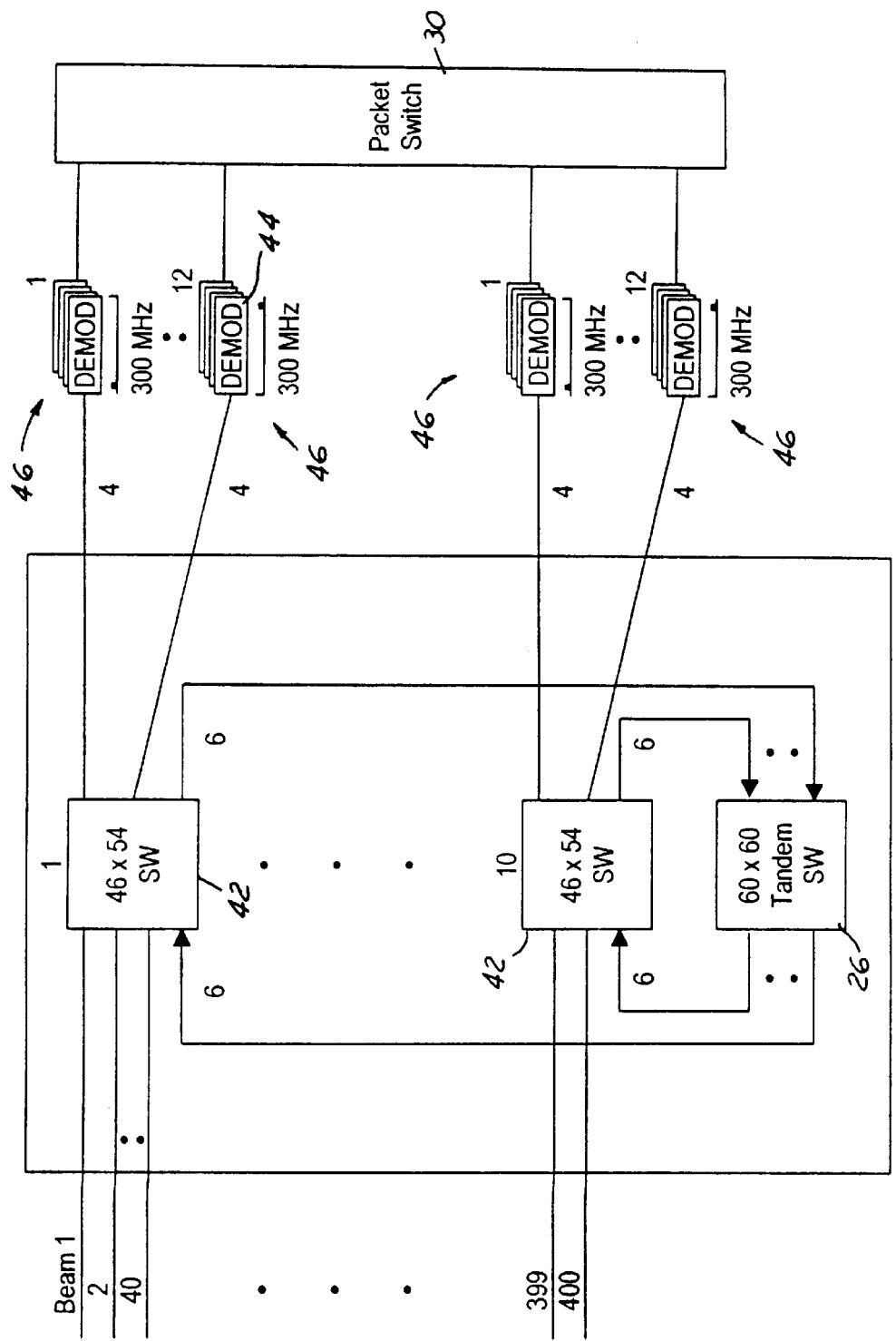
FIG. 2 is a schematic representation of a scalable switch matrix according to another embodiment of the present invention.

Referring to FIG. 2, there is shown a schematic diagram of another embodiment of the switch matrix of the present invention. In this example, again, the switch is intended to accommodate a 400 beam uplink payload having a 300 MHz spectrum divided into 12 frequency bands or subchannels.

In this case, the first switch layer 40 includes 10 46×54 switches 42. Each of the switches 42 has 46 inputs—40 per switch to accommodate the 400 uplink transmission beams, and six per switch to route overflow data traffic to the tandem switch 26. Similarly, each switch 42 has 54 outputs to accommodate four demodulators 44 per sub-band, and six outputs for overflow data traffic to the tandem switch 26.

Each demodulator 44 of a demodulator bank 46 is of the same type and operates at the same frequency band. Each demodulator band 46 connected to a different output port of the switches 42 and operates at a different frequency band. The sum of the frequency bands covers the entire allocated uplink frequency band spectrum, i.e. 300 MHz.

The switches 42 shown in FIG. 2, have broadcast or multi-cast capability as is known in the art. Thus, the switches 42 can multi-cast an input beam to any number of demodulators attached to the output ports as needed to process the data traffic on the input transmission beam. In contrast to the switches 24 of FIG. 1, switches 42 have increased flexibility in adapting to various traffic patterns, but require switches with multi-cast capability and more cross-connections.

From the foregoing, it will be seen that there has been brought to the art a new and improved switch matrix architecture which overcomes the drawbacks associated with dedicated demodulator architectures. While the invention has been described in connection with one or more embodiments, it will be understood that the invention is not limited to those embodiments. On the contrary, the invention covers all alternatives, modifications, and equivalents, as may be included within the spirit and scope of the appended claims. For example, referring to FIG. 1, all of the switches 20, 22, 24, and 28 could be of a different number and size depending upon the number and characteristics of uplink beams and available technologies. Similarly, depending upon the uplink beam payload, the second switch layer 12 may be omitted (as in FIG. 2) or a third switch layer similar to the second may be required. Also, the demodulators 14, 44 may be tunable demodulators rather than fixed at a predetermined frequency. It is, therefore, contemplated by the appended claims to cover any such modifications as incorporate those features which constitute the essential features of these improvements within the true spirit and scope of the invention.

What is claimed is:

1. A multibeam uplink switch matrix for a satellite comprising:
   a first switch layer comprising at least one point-to-multipoint switch having a plurality of input and output ports each of said input ports connected to one wideband input transmission, beam of a plurality of input transmission beams and wherein the total number of said input ports is greater than or equal to the plurality of input transmission beams; and
   a plurality of demodulator banks including at least one demodulator, each of said demodulators being adapted to demodulate a sub-band from one of said wideband input transmission beams, at least one of each of said plurality of demodulator banks connected to each of said output ports of said point-to-multipoint switch for receiving said wideband input transmission beam.

2. The multibeam uplink switch matrix of claim 1 wherein each of said demodulator banks operates at a predetermined frequency sub-band of said input transmission beams.

3. The multibeam uplink switch matrix of claim 1 wherein each of said demodulators is tunable.

4. The multibeam uplink switch matrix of claim 1, further comprising a second switch layer including at least one switch connected between said first switch layer and said plurality of demodulator banks.

5. The multibeam uplink switch matrix of claim 4 wherein said second switch layer switch is a point-to-point switch.

6. The multibeam uplink switch matrix of claim 4 wherein said second switch layer switch is a point-to-multipoint switch.

* * * * *